Figure 6:
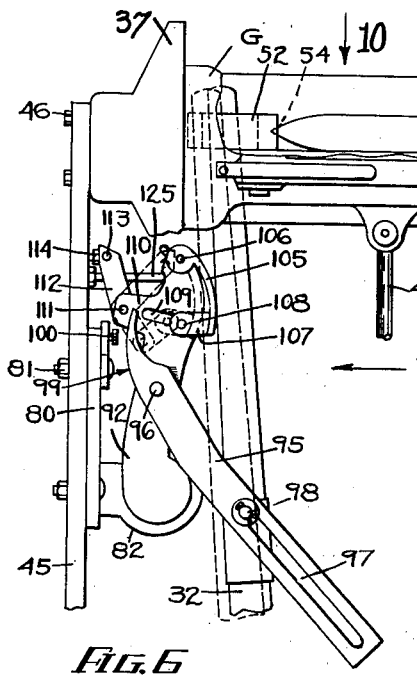

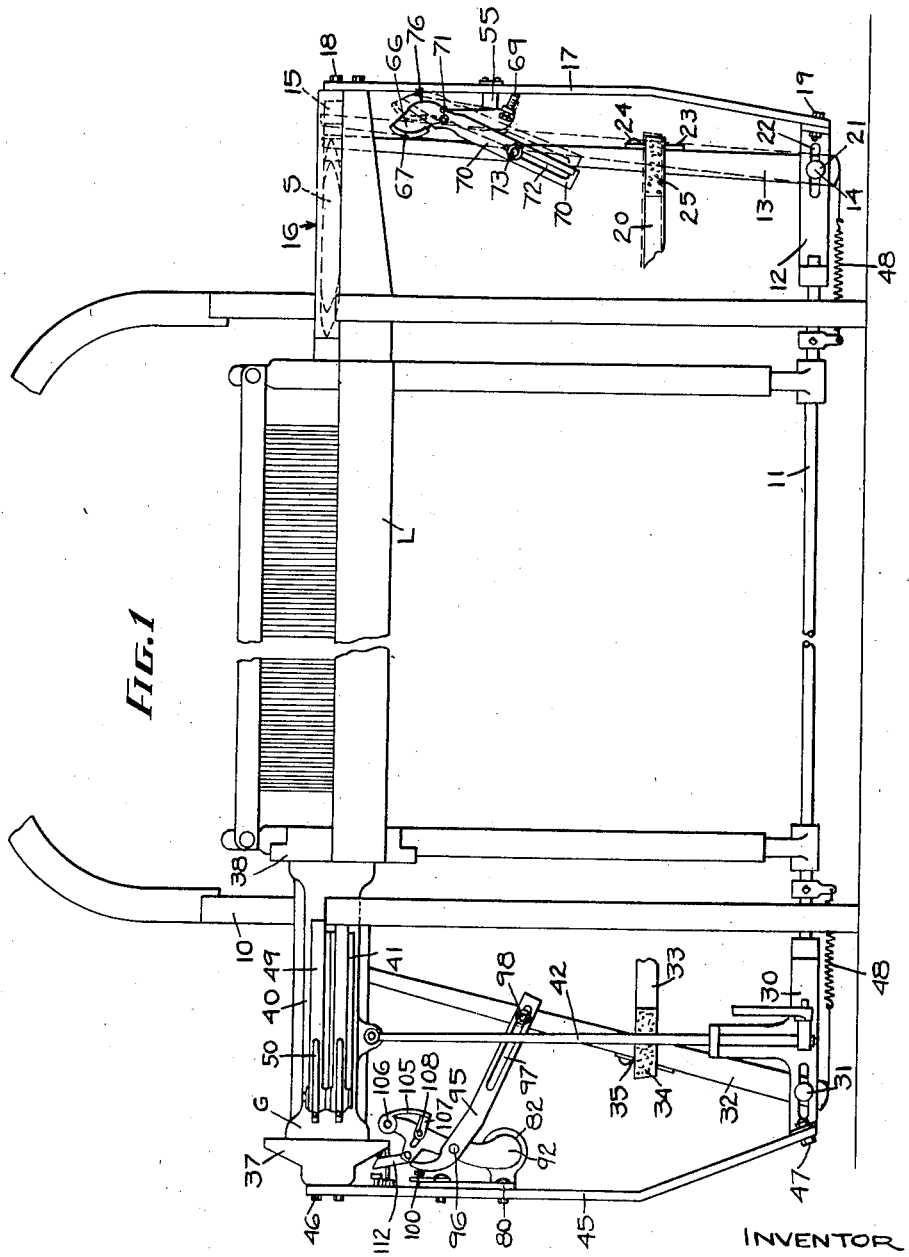

Dec. 9, 1941.  A. CEDERLUND  2,265,686
PICKER STICK CHECK FOR LOOMS
Original Filed Jan. 21, 1941  3 Sheets-Sheet 2
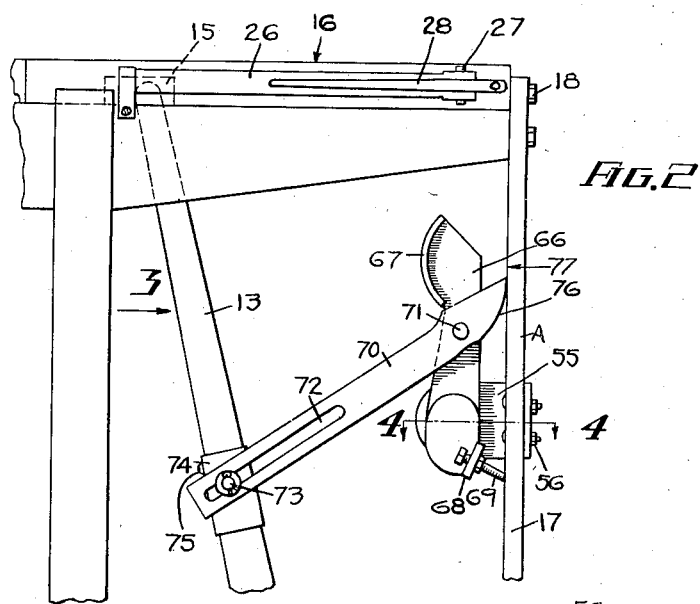
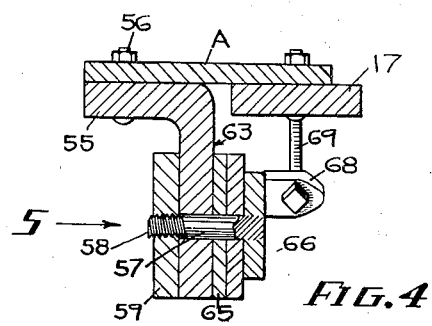
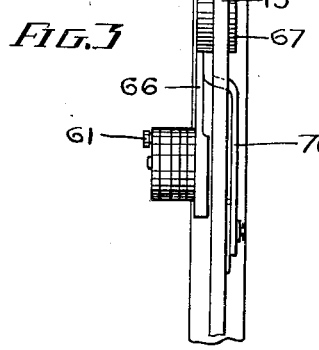
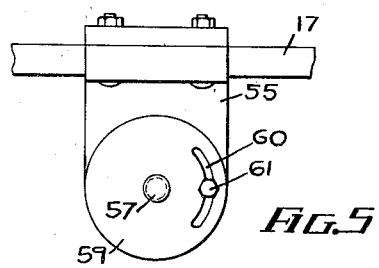
INVENTOR
ALBERT CEDERLUND
ATTORNEY Dec. 9, 1941.  A. CEDERLUND  2,265,686
PICKER STICK CHECK FOR LOOMS
Original Filed Jan. 21, 1941  3 Sheets-Sheet 3

INVENTOR
ALBERT CEDERLUND
Chas. T. Hawley
ATTORNEY

Patented Dec. 9, 1941

2,265,686

UNITED STATES PATENT OFFICE 2,265,686

PICKER STICK CHECK FOR LOOMS

Albert Cederlund, Worcester, Mass., assignor to Crompton & Knowles Loom Works, Worcester, Mass., a corporation of Massachusetts Original application January 21, 1941, Serial No. 375,138. Divided and this application May 19, 1941, Serial No. 394,127

8 Claims. (Cl. 139—155)

This is a division of my co-pending application Serial No. 375,138, filed January 21, 1941.

This invention relates to improvements in picker stick checks for looms and it is the general object of the invention to provide a picker stick check which is moved to checking position by the picker stick on a picking stroke thereof to be in position to check the shuttle when the latter next enters the shuttle box.

The usual picking mechanism employs a picker stick which is given an inward stroke to propel the shuttle from the shuttle box. Immediately after the picking stroke is completed the picker stick will ordinarily move to its outer position by spring action but may be held slightly in advance of its outermost position if a picker stick check is used. Many picker stick checks rely upon springs to move them to checking position, but in the invention set forth hereinafter I provide a link or the like which connects the picker stick to the checking arm so that the latter will be moved positively to checking position by a force derived from the picker stick.

It is a further object of my present invention to employ a form of wedge mechanism, such as a screw thread, which acts to increase the frictional resistance to outward motion of the checking arm under influence of the picker stick, and to provide adjusting means for varying the amount of friction which can be opposed to the checking arm.

In multi-shuttle looms it is customary to employ a single box at the weft replenishing end and a set of shifting shuttle boxes at the opposite end. It is a further purpose of my present invention to provide a type of picker stick check which is usable at both ends of such a loom but wherein the check at the shifting shuttle box end of the loom has provision for automatically releasing the checking arm near or at the end of the checking stroke so that the picker stick can have an additional outward motion. This additional outward motion is to permit the picker to move away from the shuttle when the shuttle boxes shift without causing the shuttle to be moved endwise by the usual camming action when the shuttle tip moves out of its pocket in the picker. This part of my invention utilizes a pair of links pivoted together, one of which is attached to the checking shoe on the check arm and the other of which is constructed to engage a stop as the checking arm swings on its pivot for the purpose of moving the links from locked to unlocked position.

With these and other objects in view which will appear as the description proceeds, my invention resides in the combination and arrangement of parts hereinafter described and set forth.

Figure 7:
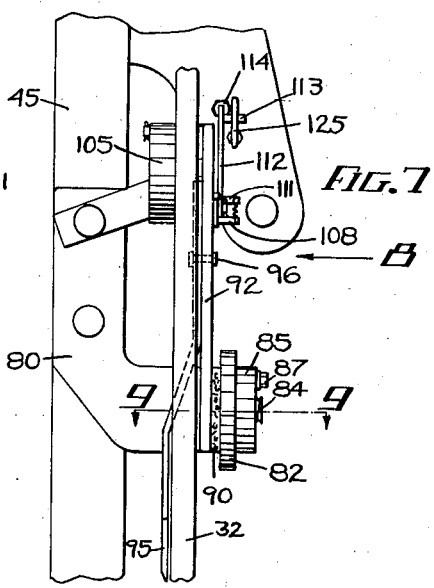
Figure 8:
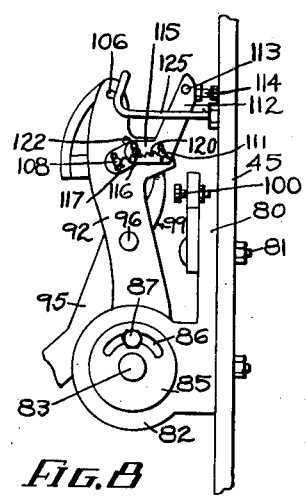
Figure 9:
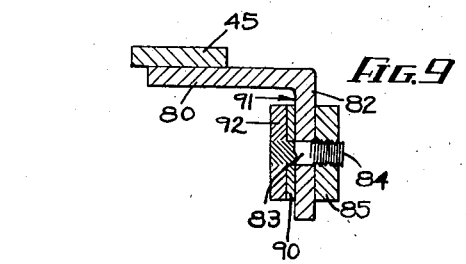
Figure 10:
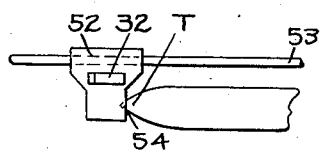

In the accompanying drawings, wherein a convenient embodiment of my invention is set forth, Fig. 1 is a front elevation of a loom having my invention applied to both ends thereof, Fig. 2 is an enlarged front elevation of a portion of Fig. 1 showing the picker stick at the end of the picking stroke on the single box end of the loom, Fig. 3 is an end elevation looking in the direction of arrow 3, Fig. 2, Fig. 4 is an enlarged horizontal section on line 4—4 of Fig. 2, Fig. 5 is a detailed end elevation looking in the direction of arrow 5, Fig. 4, Fig. 6 is an enlarged front elevation of the left hand portion of the loom having my invention adapted for use with shifting shuttle boxes and showing the picker stick in the positions it occupies during a shuttle checking operation, Fig. 7 is an end view looking in the direction of arrow 7, Fig. 6, Fig. 8 is a rear view of the part of the structure shown in Fig. 6 and looking in the direction of arrow 6, Fig. 7, Fig. 9 is a detailed horizontal section on line 9—9 of Fig. 7, and Fig. 10 is a detail plan view in the direction of arrow 10, Fig. 6, showing the relation of the usual slide picker and shuttle.

Referring particularly to Fig. 1, I have shown a loom frame 10 and a lay L which swings backwardly and forwardly in the loom frame by a well-known mechanism not shown. The lay is supported by and swings around a rocker shaft 11 in the bottom of the loom frame. The right hand end of shaft 11 is provided with a rocker foot 12 to which a picker stick 13 is pivoted at 14. The upper end of the picker stick carries a picker 15 for cooperation with the shuttle S in the single shuttle box 16 carried by the right hand end of the lay. A sheet metal brace 17 has its upper end secured to the lay as at 18 while its lower end is connected as at 19 to the rocker foot 12. The picker stick 13 is normally in its right hand position as viewed in Fig. 1 but is moved to the left to have a picking stroke by a sweep stick 20 which is given an inward motion by mechanism not shown on alternate beats of the loom when the lay has reached approximately its mid position while moving rearwardly from front to back center.

The pivotal connection 14 comprises a stud 21 held in any approved manner in a longitudinally adjusted position along a slot 22 formed in the foot 12, and the vertical position of the sweep stick 20 with respect to the picker stick may be varied by a holder 23 held to the stick by a screw 24 for locating the lug strap 25 at different distances from the pivot 14. The stroke of the picker stick and also the power which it delivers to the shuttle can therefore be adjusted as needed. The shuttle box is provided with the usual binder 26 pivoted to the lay at 27 and having a binder spring 28.

At the left end of the loom the picking mechanism is similar to that located at the plain end, the shaft 11 having a rocker foot 30 to carry a pivot 31 adjustable horizontally in the foot 30 and on which the lower end of the picker stick 32 is mounted. A sweep stick 33 and lug strap 34 are adjustable vertically along the picker stick by the holder 35 to permit adjustment of the picking stroke.

The left end of the lay is provided with outer and inner guides 37 and 38 for a vertically shifting gang G of shuttle boxes having in the present instance upper and lower cells 40 and 41, respectively, for the accommodation of two weaving shuttles. The vertical position of the gang G is derived from a box lifter rod 42 actuated by any approved form of box lifting mechanism not shown. A vertically extending brace 45 formed of sheet metal similar to the brace 17 has its upper end secured to the outer or left end of the lay as at 46 while its lower end is attached as at 47 to the rocker foot 30. Each of the cells 40 and 41 at the left hand side of the loom is provided with a binder 49 which is urged toward checking position by a binder spring 50.

During loom operation the picker sticks 13 and 32 are given picking strokes on alternate beats of the loom, a shuttle being picked from the plain box toward the shifting boxes on one beat of the loom and a shuttle being picked back to the plain box from the gang G on the next beat of the loom. The usual return springs 48 move the sticks toward outward position after the picking stroke is completed. The boxes forming the gang G may shift after receiving a shuttle from the plain end, in which case there will be a change in operative relationship between the picker 52 and the active shuttle. The upper end of the picker stick 32 drives picker 52 along a picker spindle 53 secured to the lay behind the shifting shuttle boxes. The inner end of the picker will ordinarily have a pocket 54 which receives the outer tip end T of the shuttle as the latter is boxed at the left end of the loom, see Fig. 10. When the shuttles shift vertically the tip of the shuttle engaged with the picker will endeavor to move inwardly and be cammed out of the pocket 54 if the picker is held against outward motion. If the active shuttle is held by its binder 49 the box shift will cause damage to the picker unless the latter is free to move outwardly.

In describing my invention I will first set forth its application to the plain end of the loom and then describe the form used at the shifting shuttle box side. Referring particularly to Figs. 1 to 5, I provide a support 55 secured at 56 to the brace 17 and extend therethrough a bolt 57 the left end of which as viewed in Fig. 4 is provided with screw threads 58. The threads fit into a collar 59 on the left of support 55 and provided with an arcuate slot 60 which receives a clamping bolt 61 tapped into the support. By means of the slot and bolt 61 the angular position of the collar 59 can be adjusted with respect to the support 55 to move the bolt 57 either to the left or right as viewed in Fig. 4, depending upon the direction in which the collar is turned.

Surrounding the bolt 57 and engaging the right hand surface 63 of the support 55 as seen in Fig. 4 is a friction washer 65 which may be made of leather, rubber, or other suitable material. A checking arm 66 located beyond the washer 65 with reference to support 55 is secured to the bolt 57, as by welding and extends upwardly to have formed on the top thereof a curved picker stick engaging shoe 67. Extending laterally from the lower end of the check arm is a lug 68 carrying an adjustable stop screw 69 for engagement with the brace 17.

Setting link 70 is pivoted as at 71 to the check arm and has the left end thereof provided with a slot 72 in which slides a stud 73 mounted on a sleeve 74 held in vertically adjusted position on the picker stick as at 75. The upper right hand end of the link 70 is provided with a curved surface 76 which is non-concentric with respect to the pivot 71 and curves upwardly and at increasing distances from the pivot to have engagement with a surface 77 formed on the inner side of brace 17.

The form of check shown at the drop box end of the loom is set forth more particularly in Figs. 1 and 6 to 9 and includes a support 80 secured to brace 45 at 81. Support 80 has a laterally extending arm 82 through which extends a bolt 83, the free end of which as shown in Fig. 9 has threads 84 extending through a collar 85. The latter is provided with a slot 86 through which extends a clamping bolt 87 tapped into the arm 82, and collar 85 can be adjusted angularly with respect to the arm 82 for the purpose of effecting motion of the bolt 83 either to the right or the left as viewed in Fig. 9. Surrounding the bolt 83 is a disk 90 of friction material similar to disk 65 one side of which is in close engagement with a surface 91 on the left side of arm 82 as seen in Fig. 9. The other side of the disk engages a checking arm 92 welded or otherwise fixed to the bolt 83 and extending upwardly therefrom.

A setting link 95 is pivoted as at 96 to the check arm 92 and is slotted as at 97 to receive a stud 98 similar to stud 73 and vertically adjustable on picker stick 32. The upper end of the setting link 95 has a curved surface 99 which is directed upwardly and away from the pivot 96 for engagement with the head of a screw 100 adjustable toward and from the surface 99 and mounted on the support 80.

That part of the picker stick check located at the drop box end of the loom which has already been described is similar to the check at the other end, but reference to Fig. 10 suggests the desirability of permitting the picker stick to move outwardly, or to the left, to allow the picker 52 to clear the shuttle tip should the shuttle boxes G shift.

In order to accomplish this last named result I pivot a checking shoe 105 on checking arm 92 as at 106 and provide it with a curved surface for engagement with the picker stick 32. The checking shoe 105 has a small arm 107 from which a stud 108 extends through a guide slot 109 formed in the check arm 92. A lateral extension 110 of the check arm has pivoted thereto at 111 the lower end of a release lever 112 the upper end of which carries stud 113 for engagement with a release screw 114 mounted on the brace 45 and adjustable toward and from the check arm 92. The lower end of arm 112 is extended horizontally as at 115 and is pivoted at 116 to the outer end of a link 117 which is located on that side of the check arm 92 opposite the extension 107 of the shoe 105. The other or inner end of link 117 is pivoted on the stud 108 which extends through slot 109 from check shoe 105.

When the parts are in position to start a checking stroke they will be as shown in Fig. 8 and a light tension spring 120 connecting the pivots 111 and 108 will lie below the pivot 116 to hold link 117 against a stop 122 fixed on the check arm 92. Also the stud 113 will be spaced from unlocking screw or abutment 114. In this way the spring 120 and the parts 115 and 117, together with the stop 122, constitute a yieldable lock which holds the shoe 105 normally in its checking position. A locking hook 125 carried by the support 45 is positioned for engagement with the stud 113 when the check arm is returned to its checking position by the picker stick as will be described hereinafter.

The checking operations are essentially the same at both ends of the loom, provision being made to unlock the checking shoe at the drop box end. Assuming that the picker stick at the right hand end of the loom is in a position shown in Fig. 2 which it occupies at the end of a picking stroke, the return spring 48 at the bottom of the stick will move the latter to the right until the stick reaches the full line position shown in Fig. 1. During this return motion of the stick the stud 73 has a relative upward motion in slot 72 and the link 70 turns around the pivot 71 without causing any material angular motion of the checking arm 66 and also moves the surface 76 to the left away from the surface 77 of the brace 17.

When the stick reaches the full line position in Fig. 1 further motion of it will be arrested by the friction of the check, the return spring not being sufficiently strong to overcome this friction, and the stick will remain in this position until the shuttle again enters the shuttle box 16, at which time the stick will be pushed by the shuttle against the shoe 67 and the arm 66 will move to the right on a checking stroke to its outermost position shown in dotted lines in Fig. 1. During this checking stroke the threads 58, being rigid with the check arm 66 will be turned into the collar 59 the effect of which is to draw the check arm 66 against the friction washer 65 to develop an increasing frictional resistance to motion of the picker stick and shuttle. The amount of this resistance can be varied by changing the position of the collar 59 as already described. The picker stick will come to rest when assuming the dotted line position of Fig. 1 and the check arm 66 will be in its outermost position. At the end of the checking stroke the surface 76 on the link 70 will be near or in actual engagement with the brace 17.

When the shuttle is to be picked to the left the picker stick will move from the dotted toward the full line position of Fig. 1 and ultimately reach the position shown in Fig. 2 to complete the picking stroke. During this inward swing of the picker stick the stud 73 will rock link 70 in a right hand direction around pivot 71 the effect of which is to slide the short upper end of link 70 downwardly along the brace 17 and cause angular motion of the checking arm 66 to the left to relieve the friction by turning the threads 58 in such a direction as will feed the bolt 57 to the right as viewed in Fig. 4. At the end of the picking stroke the stop screw 69 engages the brace 17 to determine the final stopping position of the check arm. The arm 66 is thus returned to checking position in readiness for another operation. I prefer to stop the motion of the check arm with the screw 69, although the picker stick moving through a fixed range of action will cause the stud 73 to raise the lower end of link 70 to substantially the same position on each picking stroke and this action may if desired be relied upon to place the checking arm.

When the check at the drop box end of the loom is in checking position shown at the left of Fig. 1 the spring lock holds the shoe 105 in extended or inmost position as shown in Fig. 8. When the picker stick returns to the full line position in Fig. 6 it will engage the shoe 105 and be held in such position awaiting the arrival of the shuttle. When the shuttle is boxed it acts through the picker 52 to move the stick to the left the effect of which is to cause the check arm 92 to have a checking stroke and move from the position shown in Fig. 1 to the position shown in Fig. 6. This motion of check arm 92 turns the threads 84 in collar 85 to cause increasing frictional resistance on the part of washer 90 to motion of the picker stick and shuttle.

The collar 85 will be set so that substantially all of the motion of the shuttle and picker stick will have been absorbed by the time stud 113 reaches the position shown in Fig. 6 and strikes the unlocking screw 114 and the remaining motion yet to be arrested will be sufficient to cause rocking of arm 112 relatively to the check arm 92 in a left hand direction as viewed in Fig. 8, thereby moving the link 117 away from the stop 122 and causing the pivot 116 to move to the opposite side of the axis of spring 120, whereupon the latter will move the parts to the position indicated in dotted lines in Fig. 6 to relieve the shoe 105 and draw the latter to retracted position. This last action will leave the shoe 105 substantially in the dotted line position shown in Fig. 6 to release the picker from the resisting mechanism by unlocking the lock and permit the picker stick to move outwardly a slight distance so that if the shuttle boxes shift the picker can move away from the shuttle point without being damaged. It is to be understood that the releasing of the check shoe 105 does not require further turning of the check arm 92 and the unlocking can be effected by the expenditure of a small amount of residual energy in the picker stick.

When the shoe 105 is unlocked the stud 113 has a right hand motion as viewed in Fig. 6 toward the resetting hook 125 which is fastened to the brace 45. When the picker stick next has a picking stroke the link 95 will have its lower end raised by a counter-clockwise rotation around axis 96 to force the surface 99 against the stop screw 100, thereby moving the check arm 92 inwardly or toward the right, see Fig. 6. Since the locking mechanism is mounted on and moves with the check arm 92 the stud 113 will eventually engage the resetting hook 125 and return the lock and the shoe 105 from the dotted unlocked position to the extended or checking position shown in full lines in Fig. 6. As the picker stick continues on a picking stroke link 95 will continue to rotate and surface 99 will return the check arm 92 to its checking position with the shoe 105 locked in checking position.

From the foregoing it will be seen that I have provided a picker stick check wherein the motion of the picker stick when propelling a shuttle positively moves a check arm to checking position by action of the links 70 and 95 and their curved upper ends. The actual checking is effected by the turning of a screw thread into a fixed collar, the angular position of which can be varied to determine the amount of pressure developed between the check arm and the leather or other friction disk. It will also be noted that the picker stick check at the drop box end of the loom is provided with a spring lock which is automatically released by the shuttle and the picker stick at the end of a checking stroke, thereby permitting the stick to move outwardly a slight amount and relieve the picker of undesirable wear should the shuttle boxes shift. This lock is automatically reset during the ensuing picking stroke. In both checks the pitch of the threads is small enough to enable the check arms to hold their positions at the end of a checking stroke and there is no tendency on the part of the screws to back away from their collars and exert a force tending to move the picker stick and shuttle toward the loom.

Having thus described my invention it will be seen that changes and modifications may be made therein by those skilled in the art without departing from the spirit and scope of the invention and I do not wish to be limited to the details herein disclosed, but what I claim is:

1. In a loom having a shuttle the point of which enters a picker and tends to move the picker when the shuttle shifts laterally with respect to the picker, the loom having a picker stick which moves with the picker and has picking and return strokes, a checking member to be moved by and resist motion of the picker stick on a return stroke of the latter, resisting means to oppose motion of the checking member by the picker stick on a return stroke of the latter, a part of the picker stick and the checking member constituting a train to connect the picker to the resisting means during a return stroke of the picker stick, and means operated by a force derived from the picker stick as the latter nears the end of a return stroke thereof to interrupt said train and disconnect the checking member from the resisting means and thereby permit movement of the picker relatively to the shuttle when the latter shifts laterally with respect to the picker.

2. In a loom having a shuttle the point of which enters a picker and tends to move the picker when the shuttle shifts laterally with respect to the picker, the loom having a picker stick moving with the picker and having picking and return strokes, a checking member to engage the picker stick and capable of having a movement in the direction in which the picker stick moves on a return stroke thereof, said movement comprising a resisted checking stroke followed by a free unresisted stroke, means connected to the checking member to resist motion thereof during the checking stroke, and means operated by a force derived from the picker stick to disconnect the checking member from the resisting means at the end of the checking stroke to permit the checking member and picker stick to have the aforesaid free unresisted stroke when the shuttle shifts laterally to move the picker.

3. In a loom having a shuttle the point of which enters a picker and tends to move the picker when the shuttle shifts laterally with respect to the picker, the loom having a picker stick moving with the picker and having a return stroke subsequent to a picking stroke, a motion resisting mechanism, means including a part of the picker stick and a lock to connect the picker to the resisting mechanism during the latter part of the return stroke of the picker stick to resist motion of the picker, and means operating with the assistance of a force derived from the picker stick as the latter nears the end of the return stroke thereof to unlock said lock and thereby release the picker from the resisting mechanism to permit the picker to move independently of the resisting mechanism and away from the shuttle when the latter shifts laterally with respect to the picker.

4. In a loom having a lay along which a shuttle moves to a given position when completely boxed and after which the shuttle shifts laterally with respect to the lay while in engagement with a picker to exert a force on the latter tending to move the same along the lay, a picker stick moving with the picker and movable by the shuttle to the starting point of a picking stroke when the shuttle moves to said given position, a checking member to engage the picker stick when the latter moves toward said starting point, means to resist motion of the checking member, mechanism to establish a relation between the checking member and the resisting means to exert a relatively high degree of opposition to the motion of the picker stick while the shuttle is moving to said given position, and other means dependent upon a force derived from the shuttle and operative when the latter reaches substantially said given position to establish a different relation between the resisting means and a checking member to offer a reduced opposition to motion of the picker stick to permit the picker to move independently of substantial opposition by the resisting means when the shuttle shifts laterally with respect to the picker.

5. In a picker stick check for a loom provided with a lay carrying a picker stick having picking and return strokes, a support member secured to the lay, a check arm pivoted on the support member and capable of having a checking stroke of given extent in one direction and a setting stroke in the opposite direction, a shoe for engagement with the picker stick movably mounted on the check arm, means to resist motion of the check arm when the latter has a checking stroke, a lock for the shoe to hold the latter normally in fixed checking position with respect to the check arm during the checking stroke of the check arm, and means dependent upon movement of the check arm and operated by a force derived from the picker stick as the latter nears the end of its return stroke to move the lock to unlocked position and unlock said shoe with respect to the checking arm, said checking shoe thereafter being capable of movement relatively to the checking arm in the direction in which the checking arm moves on the checking stroke thereof.

6. In a loom having a shuttle the point of which enters a picker and tends to move the picker when the shuttle shifts laterally with respect to the picker, a picker stick which moves with the picker and has picking and return strokes, the loom having also a lay and a support member thereon, a checking arm mounted on the support member and having a checking stroke caused by the picker stick when the latter has a return stroke, a shoe mounted on the checking arm for engagement with the picker stick to cause movement of the checking arm by the picker stick, means to lock the shoe with respect to the checking arm during the first part of a checking stroke of the checking arm, release mechanism operated by a force derived from the picker stick and transmitted through the shoe to move the locking means to unlocking position as the checking arm nears the end of the checking stroke thereof, the shoe and picker stick and picker being movable relatively to the checking arm when the lock is unlocked to permit the picker to move away from the shuttle.

7. In a loom having a shuttle the point of which enters a picker and tends to move the picker when the shuttle shifts laterally with respect to the picker, a picker stick which moves with the picker and has picking and return strokes, the loom having also a lay and a support member thereon, a checking arm having a checking stroke of given range, a picker stick engaging shoe movably mounted with respect to the checking arm, a lock to hold the shoe normally in fixed position with respect to the checking arm during the greater part of a checking stroke of said checking arm, means fixed with respect to the lay and dependent upon movement of the shoe by a force derived from the picker stick to unlock said lock for the shoe, the latter thereafter being movable relatively to the checking arm after the latter has reached the end of said given range to permit the stick and picker to move relatively to the checking arm when the shuttle shifts laterally and tends to move the picker.

8. In a loom having a picker stick operating with a picking stroke followed by a return stroke, a checking member to be connected to the picker stick to resist motion of the latter on a return stroke thereof, means to resist motion of the checking member, a lock between the checking member and the resisting means, means operated by the picker stick when the latter has a picking stroke to move the lock to a position to cause the checking member to move with the resisting means, and mechanism operated by a force derived from the picker stick when the latter has a return stroke to move the lock to a position to disconnect said checking member from the resisting means.

ALBERT CEDERLUND.